United States Patent
Purohit (10) Patent No.: US 9,763,061 B2
(45) Date of Patent: Sep. 12, 2017

(54) MULTICAST PACKET DELIVERY IN A WIRELESS NETWORK OPERATING IN STORING MODE

(71) Applicant: GainSpan Corporation, San Jose, CA (US)

(72) Inventor: Sibasis Purohit, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 134 days.

(21) Appl. No.: 14/602,295

(22) Filed: Jan. 22, 2015

(65) Prior Publication Data

US 2016/0219415 A1 Jul. 28, 2016

(51) Int. Cl.
- *H04H 20/71* (2008.01)
- *H04W 4/06* (2009.01)
- *H04L 12/741* (2013.01)
- *H04L 12/18* (2006.01)

(52) U.S. Cl.
CPC ............. *H04W 4/06* (2013.01); *H04L 45/745* (2013.01); *H04L 12/189* (2013.01)

(58) Field of Classification Search
USPC ........... 370/312, 349, 389, 390, 392, 395.31
See application file for complete search history.

(56) References Cited

U.S. PATENT DOCUMENTS

| | | |
|---|---|---|
| 7,313,596 B2 | 12/2007 | Tani et al. |
| 7,710,986 B2 | 5/2010 | Zeng et al. |
| 7,961,646 B2 | 6/2011 | Liu et al. |
| 8,289,883 B2 | 10/2012 | Zhu et al. |
| 2004/0158872 A1* | 8/2004 | Kobayashi .......... H04L 12/1886 725/120 |
| 2006/0007930 A1* | 1/2006 | Dorenbosch ........ H04L 12/1886 370/390 |

(Continued)

OTHER PUBLICATIONS

Oikonomou G, Phillips I, Stateless Multicast Forwarding with RPL in 6LowPAN Sensor Networks, "http://www.spd.gr/Files/Oikonomou-2012-1-persens.pdf", Pervasive Computing and Communications Workshops (PERCOM Workshops), 2012 IEEE International Conference on, Date of Conference:Mar. 19-23, 2012 , pp. 272-277, Publisher:IEEE.

(Continued)

*Primary Examiner* — Kwang B Yao
*Assistant Examiner* — Nguyen Ngo
(74) *Attorney, Agent, or Firm* — Pearl Cohen Zedek Latzer Baratz LLP (57) ABSTRACT

Router nodes of a wireless network deliver layer-3 multicast packets to subscribing end devices. In an embodiment, upon receiving a layer-3 multicast packet, a router determines a source that originated the layer-3 multicast packet. The router broadcasts at L2-level, the layer-3 multicast packet only if either one of a first condition and a second condition is satisfied. The first condition is satisfied only if (A) the source is not a descendant node of the router node according to the hierarchy, (B) the layer-3 multicast packet is received from a parent node, and (C) the layer-3 multicast address is subscribed to by a descendant of the router node. The second condition is satisfied only if (A) the source is a descendant of the router node, and (B) the layer-3 multicast packet is received from a child node according to the hierarchy, the source being reachable from the child node.

17 Claims, 6 Drawing Sheets

(56) References Cited

U.S. PATENT DOCUMENTS

| | | | |
|---|---|---|---|
| 2007/0189290 A1 | 8/2007 | Bauer | |
| 2008/0175239 A1* | 7/2008 | Sistanizadeh | H04L 12/18 370/390 |
| 2010/0061269 A1* | 3/2010 | Banerjee | H04L 12/4675 370/254 |
| 2012/0113986 A1* | 5/2012 | Shaffer | H04L 1/1854 370/390 |
| 2012/0155463 A1* | 6/2012 | Vasseur | H04L 67/145 370/390 |
| 2013/0121335 A1* | 5/2013 | Hui | H04L 12/18 370/390 |
| 2013/0294451 A1* | 11/2013 | Li | H04L 45/66 370/392 |
| 2014/0126575 A1 | 5/2014 | Janneteau et al. | |
| 2015/0200810 A1* | 7/2015 | Vasseur | H04L 12/1895 370/256 |
| 2016/0149856 A1* | 5/2016 | Hui | H04L 61/2015 370/252 |

OTHER PUBLICATIONS

Multicast forwarding, http://technet.microsoft.com/en-in/library/cc757858(v=ws.10).aspx , downloaded circa Nov. 26, 2014, pp. 1-2.

Configuring Multicast Forwarding, http://www.cisco.com/c/en/us/td/docs/server_nw_virtual/2-10-0_release/configuration/guide/swcg210/3multi.html , ownloaded circa Nov. 26, 2014, pp. 1-3.

JP Vasseur, Navneet Agarwal, Jonathan Hui, Zach Shelby, Paul Bertrand, Cedric Chauvenet, RPL: The IP routing protocol designed for low power and lossy networks, Internet Protocol for Smart Objects (IPSO) Alliance, date Apr. 2011, pp. 1-20.

Wei Gan, Zhiqiang Shi ; Chen Zhang ; Limin Sun ; Ionescu D, MERPL: Abstract, A more memory-efficient storing mode in RPL , Networks (ICON), 2013 19th IEEE International Conference on , Date of Conference: Dec. 11-13, 2013 , pp. 1-5, Publisher:IEEE.

* cited by examiner

| Neighbor | MAC Address | IP Address | Parent/Child |
|---|---|---|---|
| 110 | MAC-110 | IP-110 | Parent |
| 150 | MAC-150 | IP-150 | Child |
| 160 | MAC-160 | IP-160 | Child |

MULTICAST PACKET DELIVERY IN A WIRELESS NETWORK OPERATING IN STORING MODE

BACKGROUND

Technical Field

Embodiments of the present disclosure relate generally to wireless networks, and more specifically to multicast packet delivery in a wireless network operating in storing mode.

Related Art

A wireless network generally includes two or more wireless devices capable of communicating with each other on a wireless medium. The wireless network may include router nodes in the communication path between wireless devices for providing switching function based on Internet Protocol (IP) type networking protocols.

Multicasting is one mode of communication in which each packet is specified to be destined to only a subset of the wireless devices in a corresponding wireless network. A multicast address (placed in a destination address field of each packet) typically determines the corresponding subset of wireless devices, which are the intended destinations of a corresponding multicast communication.

A wireless network may operate in storing mode. Storing mode refers to a mode of operation of a wireless network in which the router nodes of the wireless network store routing information (e.g., in the form of routing tables) to enable routing of packets in the wireless network. Typically, the routing information specifies the next-hop device to which a packet is to be forwarded to enable eventual delivery of the packet to the destination node(s). In non-storing mode, only a root node stores such routing information and all wireless devices may need to rely on the root node for the routing information/operation.

Aspects of the present disclosure are directed to delivery of multicast packet to the corresponding destination wireless devices in a wireless network operating in storing mode.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Router nodes of a wireless network, provided according to an aspect of the present disclosure, deliver layer-3 multicast packets to corresponding subscribed end devices. In an embodiment, upon receiving a layer-3 multicast packet, a router determines a source that originated the layer-3 multicast packet. The router broadcasts at L2-level, the layer-3 multicast packet only if either one of a first condition and a second condition is satisfied. The first condition is satisfied only if (A) the source is not a descendant node of the router node according to the hierarchy, (B) the layer-3 multicast packet is received from a parent node, and (C) the layer-3 multicast address is subscribed to by a descendant node of the router node. The second condition is satisfied only if (A) the source is a descendant node of the router node, and (B) the layer-3 multicast packet is received from a child node according to the hierarchy, the source being reachable from the child node.

In an embodiment, each end device registers for a corresponding multicast of interest by sending the registration request towards a root node. Each intervening router node in the path updates a registration table to indicate that descendants are registered for the multicast. In an embodiment, the registration table contains a list of multicasts, with each multicast being subscribed to by at least one descendant end node.

The router nodes and the end devices may also participate in a protocol such as RPL to form a hierarchy (for routing purpose), with such hierarchy determining the parent-child relationships between respective pairs of wireless nodes.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
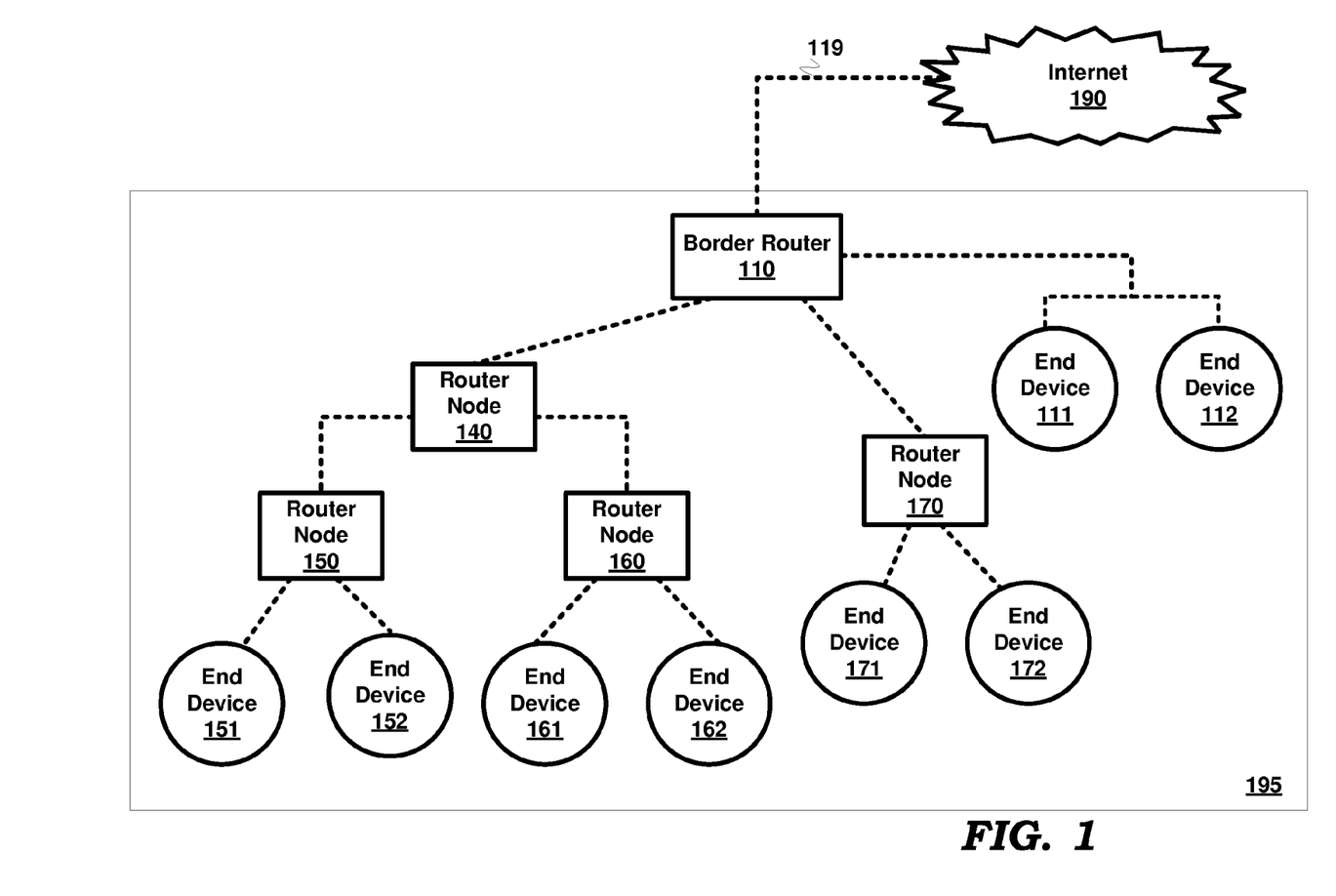
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing border router (root) 110, router nodes 140, 150, 160 and 170, end devices 111, 112, 151, 152, 161, 162, 171 and 172, and internet 190.

Each of the devices/nodes of FIG. 1 shown contained in wireless network (mesh) 195, represents a wireless device. As may be observed, the wireless devices are shown organized hierarchically based on operation of protocols such as RPL, and each dotted line of FIG. 1 thus represents a direct wireless path between two adjacent devices in the formed hierarchy. The corresponding pair of wireless devices (connected by a dotted line) are within the communication range of each other. In general, a pair of devices within communication range of each other are said to be neighbors. Thus, each pair of adjacent devices in the hierarchy are neighbors, though there can be other neighbors which are not adjacent devices in the hierarchy. Thus, for example, end devices 171 and 172 are the neighbors of router 170, and routers 150 and 160 are neighbors of router 140, etc., in the hierarchy.

Internet 190 extends the connectivity of devices in mesh network 195 to various systems (not shown) connected to, or part of, internet 190. Internet 190 is shown connected to border router 110 through a wireless path 119. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

In an embodiment, each wireless device (also termed node) of mesh 195 is a wireless station (STA) according to IEEE 802.11 (family of) standards, though alternative embodiments can be implemented using standards such as IEEE 802.15.4, as would be apparent to one skilled in the relevant arts by reading the disclosure herein. An operator/user may configure/designate which one(s) of the STAs are to operate as a border router (110 in FIG. 1), as router nodes (140, 150, 160 and 170), and as end devices (111, 112, 151, 152, 161, 162, 171 and 172). In some embodiments, a router may additionally operate as an end device also.

In an embodiment, mesh 195 is formed according to RFC 6550 entitled, "RPL protocol (IPv6 Routing Protocol for Low-Power and Lossy Networks)", by the Internet Engineering Task Force (IETF). In alternative embodiments, however, mesh 195 may be formed using other approaches. In general, the nodes in mesh 195 represent a hierarchy, with border router 110 representing the root of the hierarchy, and end devices representing corresponding leaf nodes of the hierarchy.

Wireless mesh network 195 is assumed to be configured and operable in the storing mode with respect to forwarding of unicast packets. Thus, border router 110, as well as each of the router nodes of FIG. 1, store routing information (e.g., in the form of routing tables) to enable routing of unicast packets by forwarding the unicast packets to a corresponding next-hop node in mesh 195, as is well known in the relevant arts.

Aspects of the present disclosure relate to delivery of multicast packets in a wireless network operating in storing mode, as described below with examples.

3. Forwarding of a Multicast Packet

Figure 2:
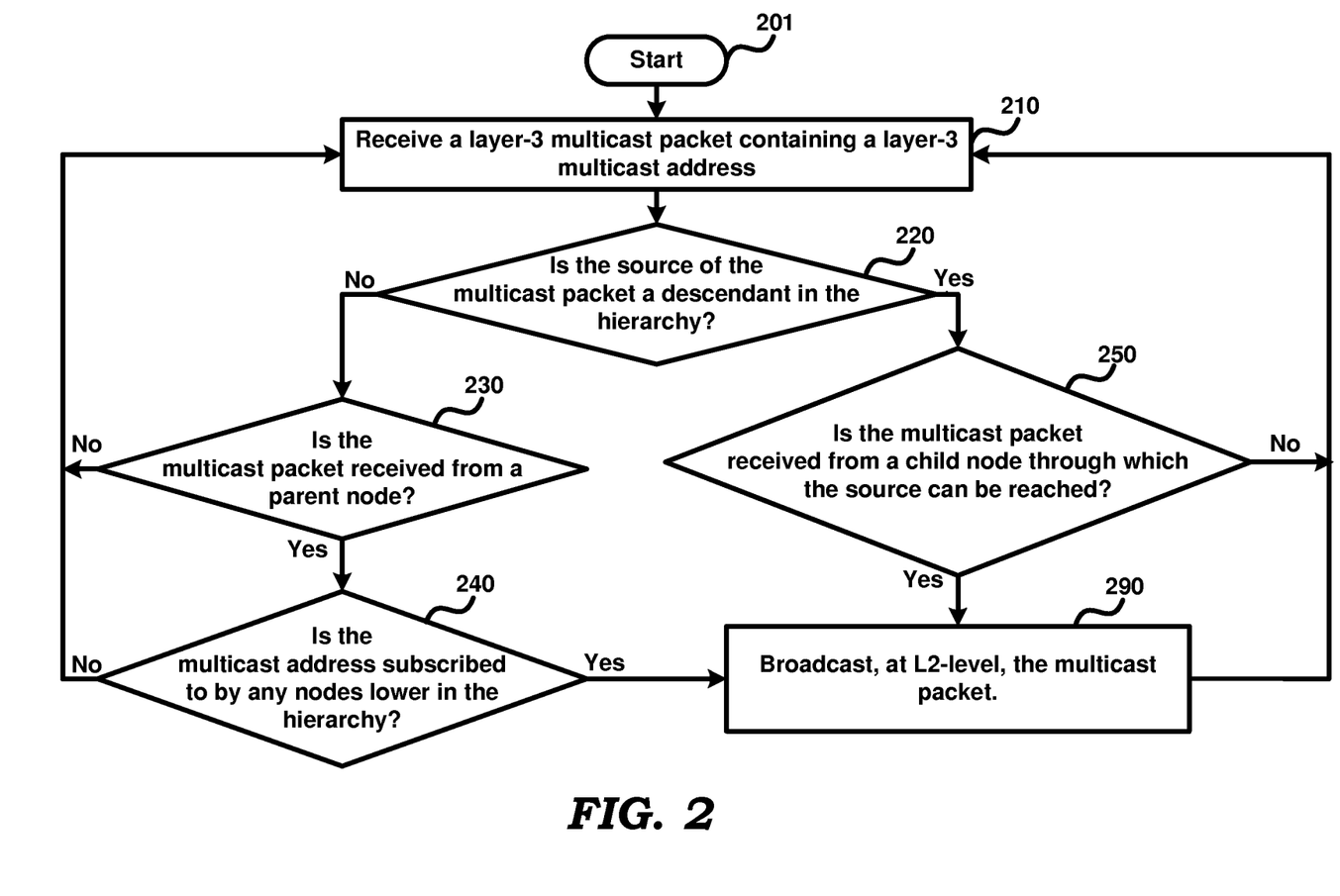
FIG. 2 is a flow chart illustrating the manner in which a router node of a wireless network processes a received multicast packet, in an embodiment of the present disclosure.

FIG. 2 is a flow chart illustrating the manner in which a router node of a wireless network supports multicasting, in an embodiment of the present disclosure. Merely for illustration, the flowchart is described below as being performed in router node 140. However, the features can be implemented in the other routers of FIG. 1 also, as well as in other environments, without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, router node 140 receives a layer-3 multicast packet identified by a layer-3 multicast address in the destination address field at the layer-3 level (e.g. IP destination address). The source/originator of the layer-3 multicast packet may either be another node within mesh 195 or a device in internet 190. Control then passes to step 220.

In step 220, router node 140 checks if the source of the layer-3 multicast packet is a descendant node (descendant) of router node 140 in the hierarchy. The source of the layer-3 multicast packet refers to the originator/creator of the packet for the purpose of mesh 195, and can be identified by the source IP address in the packet. A descendant of router node 140 is any node that is below router node 140 in the hierarchy, and includes child nodes, grandchild nodes etc. Thus, for example, in the environment of FIG. 1, only nodes 150, 160, 151, 152, 161 and 162 are descendants of router node 140. Router node 140 may maintain a list of such descendant nodes. Control passes to step 250 if the source is a descendant, and to step 230 if the source is not a descendant.

In step 230, router node 140 determines if the multicast packet is received from a parent node. A parent node refers to a node immediately above a node in the hierarchy (of mesh 195). Thus, for example, in the environment of FIG. 1, border router 110 is the parent node of router node 140. The parent node may be identified by the source MAC (Medium Access Control or L2) address in the received multicast packet (based on the hierarchy formed for the mesh network). Control passes to step 240 if the multicast packet is received from a parent node, and to step 210 if the multicast packet is not from a parent node.

In step 240, router node 140 checks if the layer-3 multicast address contained in the destination IP address field of the multicast packet is subscribed to by any descendant node(s) of router node 140 in the hierarchy. Router node 140 may locally maintain a table of layer-3 multicast addresses subscribed to by descendant nodes. Control passes to step 290 if the layer-3 multicast address is subscribed to by a descendant node and to step 210 if the layer-3 multicast address is not subscribed to by any descendant node.

In step 250, router node 140 determines if the multicast packet is received from a child node (i.e., just the preceding hop corresponding to the step 210) through which the node that initiated the multicast packet (i.e., the source of the packet) can be reached. The source of the packet is deemed to be 'reachable' from the child if a packet can be sent from the child to the source by forwarding the packet in the downward path (i.e., towards the corresponding leaf node/end device) either directly (single-hop) or via intermediate nodes. Thus, for example, end device 162 is deemed to be reachable from router node 140, since a packet from router node 140 can be forwarded in the downward path to end device 162 via router node 160. On the other hand, end device 162 is deemed not reachable from router node 150 since no downward path exists between router node 150 and end device 162 according to the formed hierarchy.

A child node refers to a node immediately below router node 140 in the hierarchy, and may be identified by the source MAC address in the multicast packet. As an example, node 150 is a child node of router node 140. Control passes to step 290 if the multicast packet is received from a child node, and to step 210 if the multicast packet is not received from a child node.

In step 290, router node 140, broadcasts, at L2-level, the layer-3 multicast packet. As is well known, L2 (layer-2) level implies that the corresponding operation concerns sharing of the medium (medium access control) and the addressing structure corresponds to L2 level (contrasted with Internet Protocol, which may be viewed as operating at layer-3/higher level). Thus, the L2 destination address is set to broadcast address before being transmitted wirelessly. Control then goes to step 210, and the corresponding steps of the flowchart may be repeated with respect to another layer-3 multicast packet.

The manner in which a neighbor table is created and maintained in a node (border router, router node or end device) of a wireless network is described next with respect to an embodiment.

4. Formation of Mesh and Creation of Neighbor Tables

As noted above, in an embodiment, mesh 195 is formed according to the RPL protocol. The RPL protocol specifies a set of ICMPv6 (Internet Control Message Protocol version 6) control messages such as DIS (DODAG Information Solicitation), DIO (DODAG Information Object) and DAO (DODAG Destination Advertisement Object) for formation of a mesh network. The format of each of the messages, and additional details of RPL are provided in RFC 6550. The term DODAG stands for Destination Oriented Directed Acyclic Graph, and represents the network topology of a wireless mesh network such as mesh 195.

Based on designated roles (router, end device or root as configured by a user/operator) for each device/node, RPL operates to define a tree structure of the wireless devices, with a border router at the root level, and end devices at the leaf levels. The tree-building process starts at border router 110, with border router 110 broadcasting a DIO message. The DIO message includes the 128-bit IPv6 (Internet Protocol version 6) address of border router 110. Wireless devices (such as router 140 and end devices 111 and 112) within wireless communication range of border router 110 receive the DIO message, and add border router 110 as a neighbor in a corresponding locally maintained neighbor table, also storing in the neighbor table the MAC and IP address of the neighbor. In addition, based on the network prefix (specified in the DIO message) indicated by border router 110 in the broadcast DIO message, each of the nodes ("range nodes") in the transmission range of border router 110 assigns itself an IP address. The respective IP addresses may be the concatenation of the network prefix and the MAC address of the corresponding node.

As a response to the DIO message received from border router 110, each of the range nodes 140, 111 and 112 transmits (separately) a corresponding (unicast) DAO message to border router 110, specifying that it has selected border router 140 as its parent. In response to receipt of the DAO messages from its neighbors, border router 110 locally stores information specifying that devices 140, 111 and 112 are its child nodes, as well as their IP addresses.

Each of the other router nodes also broadcasts (layer-3 and layer-2) corresponding DIO messages (based, for example, on timeout of a trickle timer) to advertise its presence to other nodes (not yet part of the wireless mesh network), thereby enabling such nodes to potentially join the mesh network. Thus, router node 140 broadcasts another DIO message that may be processed similarly as noted above by the range nodes (other than border router 110) of router nodes 140, namely router nodes 150 and 160. However, a "leaf node" (e.g., end devices 111 and 112) does not broadcast a DIO message, but merely transmits a DAO message to the parent, and updates its neighbor table to include the parent as a neighbor in its neighbor table.

Router nodes also aggregate address information received from various child nodes, and send corresponding DAO messages containing such address information to their parent, the parent then transmitting a corresponding DAO message in turn to its parent, till the information reaches border router 110. Thus, border router 110 eventually obtains and stores the addresses of each of the other nodes. Border router 110 stores, in a routing table, the next-hop node to which a unicast packet is to be forwarded to enable eventual delivery of the unicast packet to the destination node. Each of the router nodes (140, 150, 160 and 170) similarly builds corresponding routing tables to enable routing of unicast packets. Each of the end devices (111, 112, 151, 152, 161, 162, 171 and 172) on the other hand, only create and maintain 'neighbor tables' containing a list of the neighbor nodes (parent and any children) and their MAC (Medium Access Control) and IP addresses.

In the formation of mesh 195 described above, instead of waiting to receive a DIO message as noted above, nodes in mesh 195 may also proactively solicit information (in the form of corresponding DIO messages) from the neighbor nodes using DIS messages, as specified in RFC 6550. Further, a node may receive DIO messages from multiple other router/root nodes, and make a decision based on certain rules (according to parameters such as objective function, DAG characteristics, advertised path cost, etc., as specified by the RPL protocol) as to which router/root node to designate as its parent.

Figure 3A:
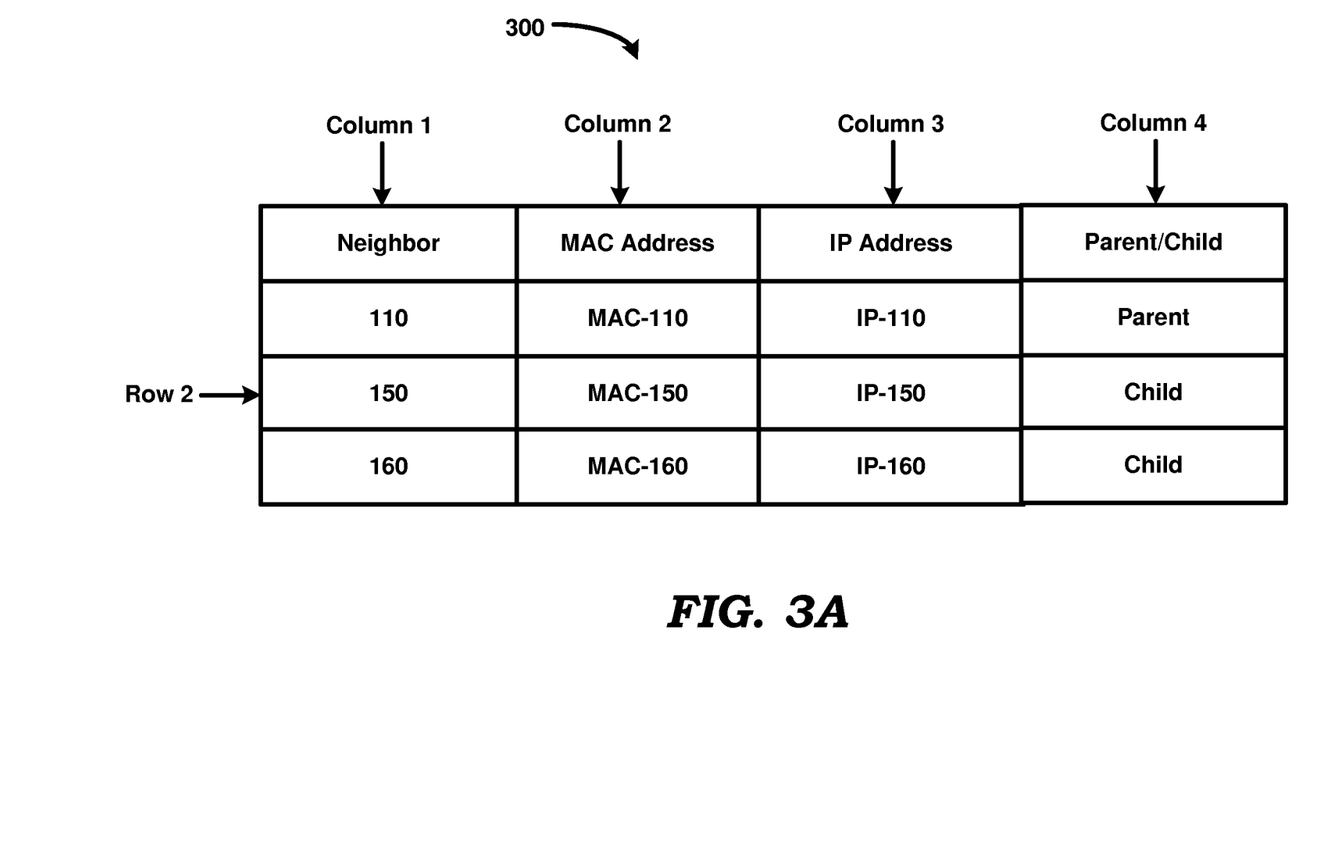
FIG. 3A is a diagram showing the contents of a neighbor table maintained in a router node of a wireless network, in an embodiment of the present disclosure.

FIG. 3A is a diagram of a neighbor table 300 that may be created and maintained in router node 140. Column 1 of table 300 lists the neighbors, column 2 the MAC address of the neighbors, column 3 the IP address of the neighbors, and column 4 indicates whether the neighbor is a parent node or a child node of router node 140. Thus, row 2 of table 300 indicates that router node 150 is a neighbor, that MAC-150 and IP-150 are respectively the MAC and IP addresses of router node 150, and that router node 150 is a child node of router node 140. Each of the other router nodes as well as the end devices of FIG. 1 create and maintain similar neighbor tables. For example, the neighbor table of end device 151 would indicate only one neighbor, i.e., router node 150, and the MAC and IP addresses of router node 150. As another example, the neighbor table of router node 160 would contain three neighbors, namely router node 140, end device 161 and end device 162, the respective MAC and IP addresses, and indicate whether a corresponding node is a child node or parent node.

It is noted here, that although not shown present in FIG. 1, a node may have a neighbor that is neither its parent nor its child node. To illustrate, assuming, router nodes 150 and 160 are within communication range of each other, then router nodes 150 and 160 are neighbors, even though neither is a parent or child of the other. Due to the operation of step 230 and 250, packets received from neighbor nodes which are not parents/children, are not further broadcast in step 290.

Figure 3B:
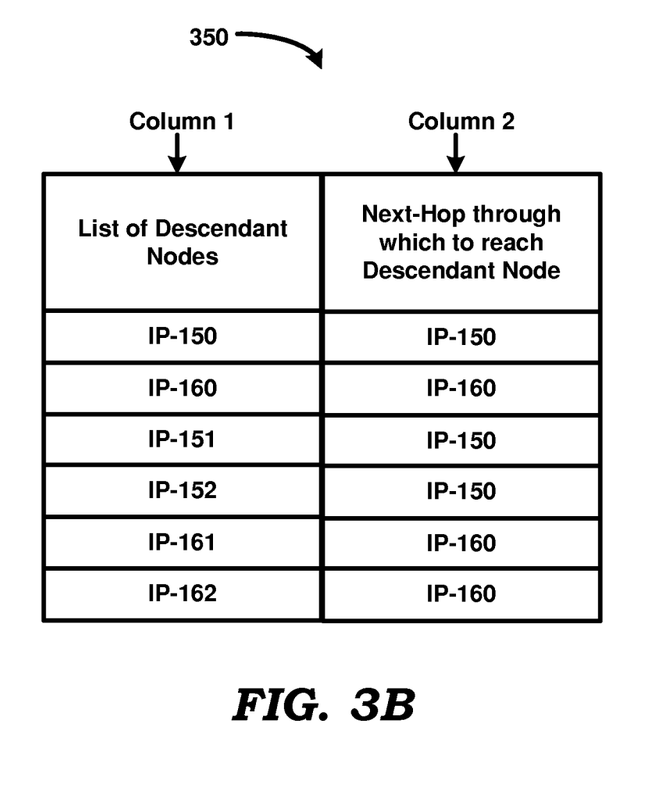
FIG. 3B is a diagram showing a list of descendant nodes of a router node, as maintained in the router node, in an embodiment of the present disclosure.

In addition to the neighbor table, each node that is not an end device also maintains a list of its descendant nodes. Thus, for example, router node 140 maintains a table 350 listing, in column 1, the layer-3 (e.g., IP) addresses of nodes 150, 160, 151, 152, 161 and 162, as shown in FIG. 3B. In FIG. 3B, IP-150, IP-160, IP-151, IP-152, IP-161 and IP-162 represent the layer-3 addresses of the descant nodes 150, 160, 151, 152, 161 and 162 respectively. Column 2 of table 350 lists the next-hop node (from router node 140) through which to reach the corresponding descendant node.

Although shown separately, the information in list 350 can be integrated in table 300 of FIG. 3A also. In the case of router nodes 150, 160 and 170, the corresponding information would already be contained in the corresponding neighbor table. For example, with respect to router node 150, end devices 151 and 152 are descendant nodes in the hierarchy, and the corresponding information of the two nodes would be contained in the neighbor table maintained by router node 150. Additionally, a separate list containing the layer-3 addresses of the descendant nodes 151 and 152 may be maintained.

Each of border router 110 and the router nodes (140, 150, 160 and 170) also maintains information specifying the list of layer-3 (e.g., IP) multicast addresses subscribed to by corresponding descendant nodes. In an embodiment, such information is formed at each of the corresponding nodes at the time of registration of an end device for a multicast address, as described below.

5. Registering for a Multicast Address

According to an aspect of the present disclosure, an end device that wishes to be a recipient/destination for a layer-3 multicast address registers with border router 110. The end device, therefore, transmits a registration request in the form of a corresponding DAO message to border router 110 via all the intervening router nodes. To clarify with an example embodiment, assume that end devices 151, 152 and 161 wish to register for a layer-3 multicast address M1.

End device 161 transmits a corresponding registration request in the form of a DAO message (which also contains the layer-3 multicast address M1 in the body of the message) with destination IP address that of border router 110, and destination MAC address that of its parent, i.e., router node 160.

Router node 160 receives the registration request. Router node 160 adds the layer-3 multicast address M1 in a locally maintained registration table (not shown). Router node 160 then forwards the registration request with the MAC address of its parent router node 140 as the destination MAC address, while retaining the IP address of border router 110 in the destination IP address field.

Router node 140 receives the forwarded registration request. Router node 140 adds the layer-3 multicast address M1 in a locally maintained registration table 400, shown in FIG. 4. Router node 140 then forwards the registration request with the MAC address of its parent border router 110 as the destination MAC address, while retaining the IP address of border router 110 in the destination IP address field.

Border router 110 receives the forwarded registration request. Border router 110 adds the layer-3 multicast address M1 in a locally maintained multicast table (not shown).

Figure 4:
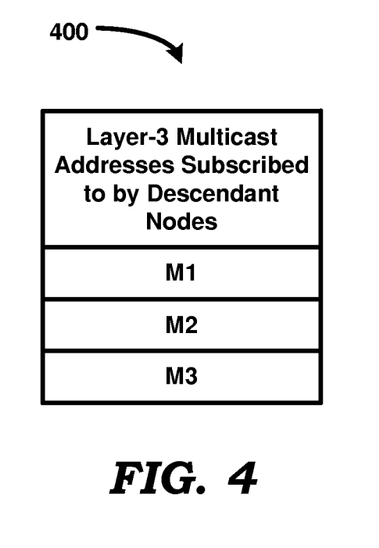
FIG. 4 is a list of multicast addresses maintained in a router node, with the multicast addresses being those subscribed to by descendant nodes of the router node, in an embodiment of the present disclosure.

Each of end devices 151 and 152 similarly transmits respective registration requests to border router 110 via router node 150 and router node 140. End devices subscribing to other layer-3 multicast addresses similarly send registration requests to border router 110, with the intervening router nodes in the path between the corresponding end device and border router 110 updating their registration tables accordingly. A registration table maintained by a router node (or border router 110) lists all the multicast addresses subscribed to by descendant nodes in the hierarchy. Thus, for example, M1, M2 and M3 of table 400 (maintained in router node 140) of FIG. 4 are assumed to be the complete set of layer-3 multicast addresses subscribed to by descendant end devices 151, 152, 161 and 162.

In another embodiment, an end device transmits the registration request directly to its parent, i.e., the destination IP address, as well as the destination MAC address, are that of the parent, rather than border router 110. The parent node updates its registration table and in turn forwards the request directly to its parent, and so on, till a registration request reaches border router 110.

Once neighbor tables, registration tables and lists of descendant nodes are created in border router 110 and each of the router nodes of mesh 195 in the manner similar to that described above, multicast data may be delivered to destination nodes in mesh 195, as illustrated next with an example. It is assumed in the following example that each of end devices 151, 152 and 161 has subscribed to (registered for) multicast address M1.

Assuming that end device 162 is to transmit a multicast packet with multicast address M1, end device 161 generates the multicast packet (referred to below conveniently as 'M1 packet'), and broadcasts (at L2 level) the M1 packet. Router node 160 receives the M1 packet. Since the source of the M1 packet is a descendant node (here node 162) (step 220 of the flowchart of FIG. 2), and is received from a child node through which the source of the packet can be reached (step 250), router node 160 broadcasts, at L2-level, the M1 packet (step 290).

End device 161 receives the M1 packet broadcast by router node 160, and processes the packet suitably. End device 162 also receives the M1 packet broadcast by router node 160, but would discard the packet according to the flowchart of FIG. 2 since step 240 would evaluate false. Router node 140 receives the M1 packet broadcast by router node 160. Again, since the source of the M1 packet is a descendant (here node 162) of router node 140, and is received from a child node through which the source of the packet can be reached (step 250), router node 140 broadcasts, at L2-level, the M1 packet (step 290).

Border router 110 and each of router nodes 150 and 160 receive the M1 packet broadcast by router node 140. Router node 160 would discard the packet since step 250 would evaluate false. Router node 150 would in turn broadcast the M1 packet (step 290) since steps 220, 230 and 240 would respectively evaluate false, true and true. Border router 110 would also broadcast the received M1 packet since steps 220 and 250 would respectively evaluate true and true.

Each of end devices 151 and 152 receives the M1 packet broadcast by router node 150, and process the packets suitably. Router node 140 would receive the M1 packet broadcast by router node 150, but would not further broadcast the M1 packet, since step 250 would evaluate false.

Router nodes 140 and 170, as well as end devices 111 and 112 receive the M1 packet broadcast by border router 110. End devices 111 and 112 and router node 170 would discard the packet since step 240 would evaluate false. Router node 140 would also discard the packet since step 250 would evaluate false.

The implementation details of a router node (110, 140, 150, etc.) in an embodiment of the present disclosure are provided next.

6. Example Implementation

Figure 5:
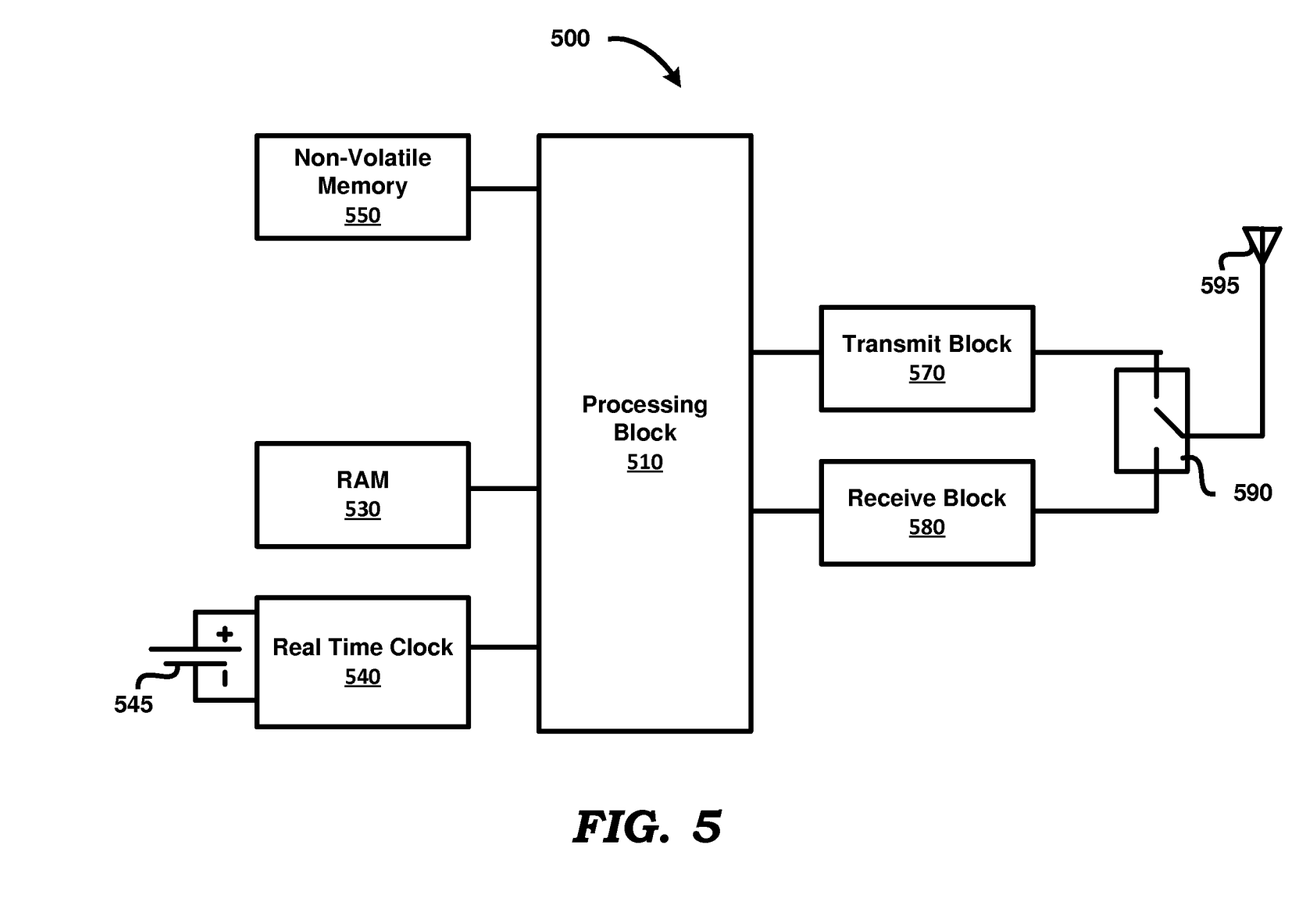
FIG. 5 is a block diagram illustrating the implementation details of a wireless station in an embodiment of the present disclosure.

FIG. 5 is a block diagram showing the implementation details of a router node in an embodiment of the present disclosure. Router 500 can correspond to any of the routers (110, 140, 150, etc.) of FIG. 1, and is shown containing processing block 510, random access memory (RAM) 530, real-time clock (RTC) 540, battery 545, non-volatile memory 550, transmit block 570, receive block 580, switch 590, and antenna 595. The whole of router node 500 may be implemented as a system-on-chip (SoC), except for battery 545 and antenna 595. Alternatively, the blocks of FIG. 5 may be implemented on separate integrated circuits (IC).

Battery 545 provides power for operation of router node 500, and may be connected to the various blocks shown in FIG. 5 (although shown connected only to RTC 540). RTC 540 operates as a clock, and provides the 'current' time to processing block 510.

Antenna 595 operates to receive from, and transmit to, a wireless medium, corresponding wireless signals (e.g., according to IEEE 802.11 (WLAN) standards). Switch 590 may be controlled by processing block 510 (connection not shown) to connect antenna 595 to one of blocks 570 and 580 as desired, depending on whether transmission or reception of wireless signals is required. Switch 590, antenna 595 and the corresponding connections of FIG. 5 are shown merely by way of illustration. Instead of a single antenna 595, separate antennas, one for transmission and another for reception of wireless signals, can also be used. Various other techniques, well known in the relevant arts, can also be used instead.

Transmit block 570 receives, from processing block 510, data to be transmitted on a wireless signal (e.g., according to a wireless standard such as IEEE 802.11), generates a modulated radio frequency (RF) signal (according to the standard), and transmits the RF signal via switch 590 and antenna 595. Transmit block 470 may contain RF and baseband circuitry for generating and transmitting wireless signals, as well as for medium access operations. Alternatively, transmit block 570 may contain only the RF circuitry, with processing block 510 performing the baseband and medium access operations (in conjunction with the RF circuitry).

Receive block 580 represents a receiver that receives a wireless (RF) signal (e.g., according to IEEE 802.11) bearing data and/or control information via switch 590, and antenna 595, demodulates the RF signal, and provides the extracted data or control information to processing block 510. Receive block 580 may contain RF as well as baseband processing circuitry for processing a WLAN signal. Alternatively, receive block 580 may contain only the RF circuitry, with processing block 510 performing the baseband operations in conjunction with the RF circuitry.

When router 500 is implemented according to IEEE 802.15.4 standards, transmit block 570, receive block 580, antenna 595 and the corresponding signals would be according IEEE 802.15.4.

Non-volatile memory 550 is a non-transitory machine readable medium, and stores instructions, which when executed by processing block 510, causes router node 500 to operate as described above. In particular, the instructions enable router node 500 to operate as described with respect to the flowchart of FIG. 2.

RAM 530 is a volatile random access memory, and may be used for storing instructions and data. In addition, RAM 530 may be used to store the neighbor table, list of descendant nodes (e.g., as in list 350 of FIG. 3) and registration table as described above.

RAM 530 and non-volatile memory 550 (which may be implemented in the form of read-only memory/ROM/Flash) constitute computer program products or machine (or computer) readable medium, which are means for providing instructions to processing block 510. Processing block 510 may retrieve the instructions, and execute the instructions to provide several features of the present disclosure.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable router node 500 to operate according to several aspects of the present disclosure, described above in detail.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of forwarding packets in a router node of a wireless network, said wireless network containing a set of end devices and a set of router nodes, said set of router nodes including said router node, said set of router nodes and said set of end devices being organized in a hierarchy with each of said set of end devices forming leaf nodes in said hierarchy, said method comprising:

participating in a routing protocol to form said hierarchy in said wireless network, wherein said hierarchy comprises at least four levels with at least some of said set of end devices being at the lowest level of said at least four levels;

receiving a layer-3 multicast packet containing a layer-3 multicast address in a destination layer-3 address field, wherein said receiving receives said layer-3 multicast packet as a L2 broadcast;

determining a source that originated said layer-3 multicast packet;

broadcasting, at L2-level, said layer-3 multicast packet only if either one of a first condition and a second condition is satisfied, wherein said first condition is satisfied only if:

said source is not a descendant node of said router node according to said hierarchy, and said layer-3 multicast packet is received from a parent node according to said hierarchy, and said layer-3 multicast address is subscribed to by a descendant node of said router node according to said hierarchy, wherein said second condition is satisfied only if:

said source is a descendant node of said router node according to said hierarchy, and said layer-3 multicast packet is received from a child node according to said hierarchy, wherein said source is reachable from said child node; and discarding said layer-3 multicast packet if neither one of said first condition and said second condition is satisfied.

2. The method of claim 1, further comprising maintaining a list of descendant nodes and a registration table containing multicast addresses subscribed to by said descendant nodes, wherein said list of descendant nodes is examined to check whether or not said source is reachable from said child node, wherein said registration table is examined to check whether or not said layer-3 multicast address is subscribed to by any descendants.

3. The method of claim 2, wherein said layer-3 is according to Internet Protocol (IP), and said layer-2 is according to one of IEEE 802.11 and IEEE 802.15.4.

4. The method of claim 3, further comprising:

receiving a registration request from a first child node in the form of an IP (Internet Protocol) packet encapsulated in layer-2 header, said registration request specifying an end device for registration to receive multicast packets of a first multicast, wherein said layer-2 header specifies said router node as a destination and an IP header of said IP packet specifies said border router as a destination;

updating said registration table to indicate that said first child node is registered to receive packets of said first multicast; and forwarding said registration request to a parent of said router node.

5. The method of claim 4, wherein said routing protocol is according to IPv6 Routing Protocol for Low-Power and Lossy Networks (RPL), and wherein said registration request is according to a Destination Oriented Directed Acyclic Graph Destination Advertisement Object (DAO) message of said RPL.

6. The method of claim 5, wherein said list of descendant nodes is formed during said participating.

7. A non-transitory machine readable medium storing one or more sequences of instructions for enabling a router node of a wireless network to forward packets, said wireless network containing a set of end devices and a set of router nodes, said set of router nodes including said router node, said set of router nodes and said set of end devices being organized in a hierarchy with each of said set of end devices forming leaf nodes in said hierarchy, wherein execution of said one or more instructions by one or more processors contained in said router node enables said router node to perform the actions of:

participating in a routing protocol to form said hierarchy in said wireless network, wherein said hierarchy comprises at least four levels with at least some of said set of end devices being at the lowest level of said at least four levels;

receiving a layer-3 multicast packet containing a layer-3 multicast address in a destination layer-3 address field, wherein said receiving receives said layer-3 multicast packet as a L2 broadcast;

determining a source that originated said layer-3 multicast packet; and broadcasting, at L2-level, said layer-3 multicast packet only if either one of a first condition and a second condition is satisfied, wherein said first condition is satisfied only if:

said source is not a descendant node of said router node according to said hierarchy, and said layer-3 multicast packet is received from a parent node according to said hierarchy, and said layer-3 multicast address is subscribed to by a descendant node of said router node according to said hierarchy, wherein said second condition is satisfied only if:

said source is a descendant node of said router node according to said hierarchy, and said layer-3 multicast packet is received from a child node according to said hierarchy, wherein said source is reachable from said child node; and discarding said layer-3 multicast packet if neither one of said first condition and said second condition is satisfied.

8. The non-transitory machine readable medium of claim 7, further comprising instructions for causing said router node to maintain a list of descendant nodes and a registration table containing multicast addresses subscribed to by said descendant nodes, wherein said list of descendant nodes is examined to check whether or not said source is reachable from said child node, wherein said registration table is examined to check whether or not said layer-3 multicast address is subscribed to by any descendants.

9. The non-transitory machine readable medium of claim 8, wherein said layer-3 is according to Internet Protocol (IP), and said layer-2 is according to one of IEEE 802.11 and IEEE 802.15.4.

10. The non-transitory machine readable medium of claim 9, further comprising instructions to cause said router node to perform the actions of:

receiving a registration request from a first child node in the form of an IP (Internet Protocol) packet encapsulated in layer-2 header, said registration request specifying an end device for registration to receive multicast packets of a first multicast, wherein said layer-2 header specifies said router node as a destination and an IP header of said IP packet specifies said border router as a destination;

updating said registration table to indicate that said first child node is registered to receive packets of said first multicast; and forwarding said registration request to a parent of said router node.

11. The non-transitory machine readable medium of claim 10, wherein said routing protocol is according to IPv6 Routing Protocol for Low-Power and Lossy Networks (RPL), and wherein said registration request is according to a Destination Oriented Directed Acyclic Graph Destination Advertisement Object (DAO) message of said RPL.

12. The non-transitory machine readable medium of claim 11, wherein said list of descendant nodes is formed during said participating.

13. A router node of a wireless network, said wireless network containing a set of end devices and a set of router nodes, said set of router nodes including said router node, said set of router nodes and said set of end devices being organized in a hierarchy with each of said set of end devices forming leaf nodes in said hierarchy, said router node comprising:

a processing block and a memory, said memory to store instructions which when retrieved and executed by said processing block causes said router node to perform the actions of:

participating in a routing protocol to form said hierarchy in said wireless network, wherein said hierarchy comprises at least four levels with at least some of said set of end devices being at the lowest level of said at least four levels;

receiving a layer-3 multicast packet containing a layer-3 multicast address in a destination layer-3 address field, wherein said receiving receives said layer-3 multicast packet as a L2 broadcast;

determining a source that originated said layer-3 multicast packet; and broadcasting, at L2-level, said layer-3 multicast packet only if either one of a first condition and a second condition is satisfied, wherein said first condition is satisfied only if:

said source is not a descendant node of said router node according to said hierarchy, and said layer-3 multicast packet is received from a parent node according to said hierarchy, and said layer-3 multicast address is subscribed to by a descendant node of said router node according to said hierarchy, wherein said second condition is satisfied only if:

said source is a descendant node of said router node according to said hierarchy, and said layer-3 multicast packet is received from a child node according to said hierarchy, wherein said source is reachable from said child node, and discarding said layer-3 multicast packet if neither one of said first condition and said second condition is satisfied.

14. The router node of claim 13, wherein said processing block further performs the action of maintaining a list of descendant nodes and a registration table containing multicast addresses subscribed to by said descendant nodes, wherein said processing block examines said list of descendant nodes to check whether or not said source is reachable from said child node, wherein said processing block examines said registration table to check whether or not said layer-3 multicast address is subscribed to by any descendants.

15. The router node of claim 14, wherein said layer-3 is according to Internet Protocol (IP), and said layer-2 is according to one of IEEE 802.11 and IEEE 802.15.4.

16. The router node of claim 15, wherein said processing block further performs the actions of:

receiving a registration request from a first child node in the form of an IP (Internet Protocol) packet encapsulated in layer-2 header, said registration request specifying an end device for registration to receive multicast packets of a first multicast, wherein said layer-2 header specifies said router node as a destination and an IP header of said IP packet specifies said border router as a destination;

updating said registration table to indicate that said first child node is registered to receive packets of said first multicast; and forwarding said registration request to a parent of said router node.

17. The router node of claim 16, wherein said routing protocol is according to IPv6 Routing Protocol for Low-Power and Lossy Networks (RPL), and wherein said registration request is according to a Destination Oriented Directed Acyclic Graph Destination Advertisement Object (DAO) message of said RPL.

* * * * *